Nov. 14, 1939.  J. W. LEIGHTON  2,180,282
METHOD OF MAKING BEARINGS
Filed Aug. 23, 1937
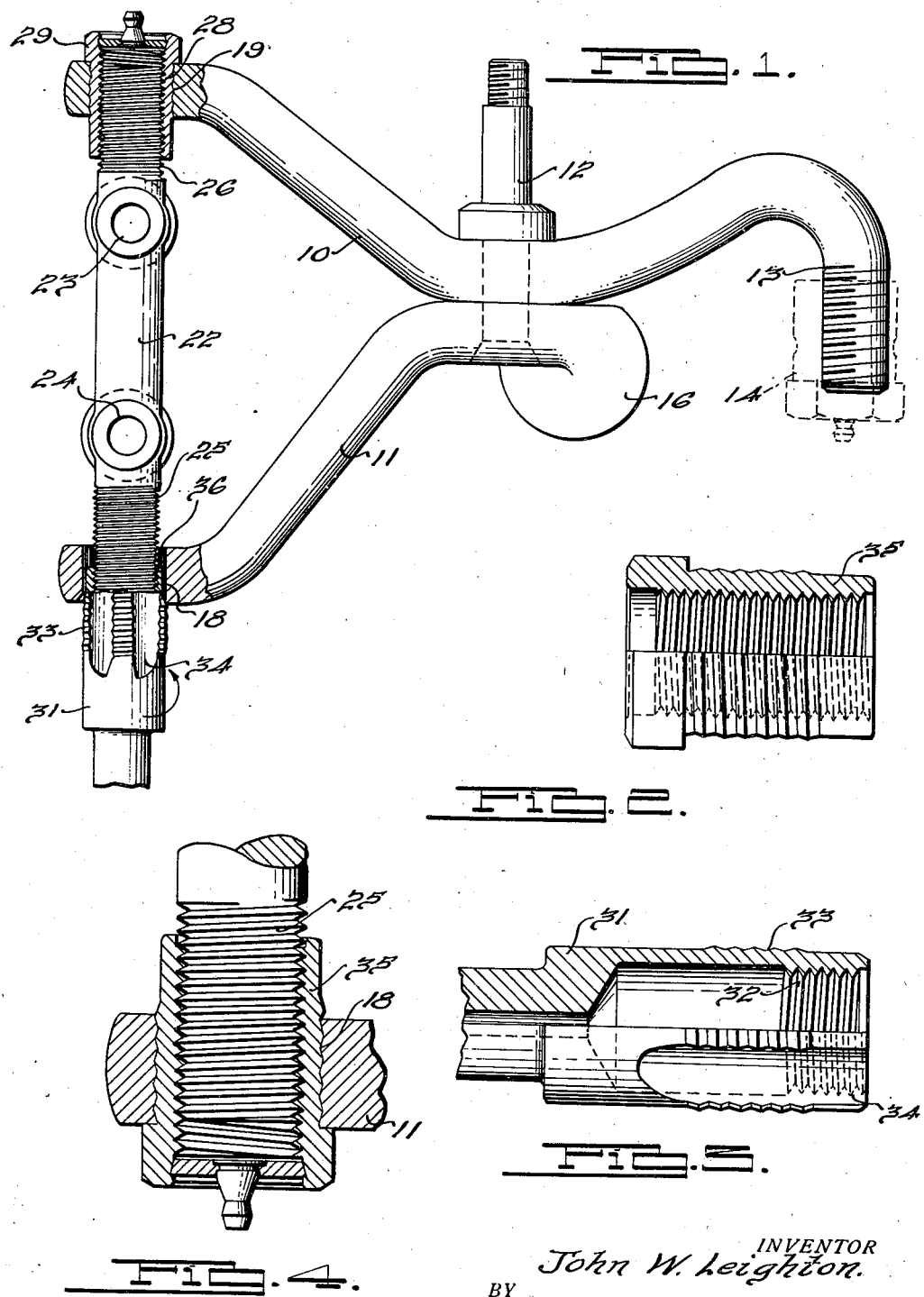
INVENTOR
John W. Leighton.
BY
Harness, Dickey & Pierce.
ATTORNEYS.

Patented Nov. 14, 1939

2,180,282

UNITED STATES PATENT OFFICE 2,180,282

METHOD OF MAKING BEARINGS

John W. Leighton, Port Huron, Mich.

Application August 23, 1937, Serial No. 160,396

2 Claims. (Cl. 29—149.5)

The invention relates to the manufacture and assembly of threaded pivotal bearings, and it has particular relation to the manufacture and assembly of threaded pivotal bearings for individual wheel suspensions in automobiles.

In certain respects the invention is similar to that disclosed in my copending application for patent, Serial No. 69,785, filed March 20, 1936.

In certain instances, and in particular in connection with individual wheel suspensions, two parts of a structure are pivotally connected by threaded bearings, and it is desirable that the threads in the bearings be so matched that there will be no binding action or undesirable friction in the threads during oscillatory movement of one part with respect to the other. In the application for patent above identified, the matching of threads is effected by threading a bushing on to a threaded pin portion and simultaneously causing external threads on the bushing to form threads in an opening receiving the pin portion, all of this being done after a first threaded bearing has been effected at another point. Since the bushing forms its own threads in the opening mentioned, it is apparent that relative movement of the pin portion and the portion having the opening is not required and accordingly the threads at both points will be freely pivotal.

The present invention has for its principal object an improvement in the manufacture and assembly of threaded bearings as compared to the manufacture and assembly disclosed in the previous application mentioned, in eliminating the bushing as the thread forming member.

Another object of the invention is to provide improvements in the manufacture and assembly of threaded bearings wherein bushings are employed which avoid undesirable stresses that sometimes occur in the bushing when it forms its own threads.

Other objects of the invention will become apparent from the following specification, the drawing to which it relates, and from the claims hereinafter set forth.

For a better understanding of the invention, reference may be had to the accompanying drawing, wherein:

Figure 1 is a plan view of the upper control arm of an individual wheel suspension as constructed according to one form of the invention;

Fig. 2 is a detail view, partly in section, illustrating a bushing forming a part of the threaded bearing;

Fig. 3 is a detail view illustrating a tap employed for cutting threads prior to insertion of the bushing; and Fig. 4 is a detail view illustrating one end of the threaded bearing after the bushing is installed.

Referring to Figure 1, the arm illustrated includes two rod portions 10 and 11 joined intermediate the ends of the arm by means of a pin 12 adapted for connecting one end of a shock absorber to the arm, in the relation shown and claimed in my copending application Serial No. 106,340, filed October 19, 1936. The end of the portion 10 extends laterally beyond the end of portion 11 and terminates in a bent, offset, and threaded end 13, which is adapted to be pivotally connected to a wheel mounting member. A bushing for mounting the wheel member on the threaded offset end 13 is indicated at 14. At its obtuse end, the portion 11 of the arm has a flattened sector 16 which may serve as a means for engaging a wheel raising jack with the suspension. Opposite ends of the portions 10 and 11 terminate in flattened sectors having openings 18 and 19 which are aligned. Both portions 10 and 11 of the arm preferably are manufactured from round bar stock, which is upset and bent as required.

For pivotally connecting the arm to the frame of an automobile, a round bar 22 is provided which has upset apertured portions 23 and 24 adapted to receive bolts for fastening the bar to the frame. Opposite ends of the bar are threaded, as indicated at 25 and 26, it being understood that these threads are of the same pitch and lead. As seen in the drawing, the upper end of the bar 22 has a threaded pivotal engagement with a tubular bushing 28 that is also threaded into the opening 19. The internal threads on the bushing are the same as the threads on the threaded portion 26 of the bar and the external threads on the bushing and in the opening 19 are of the same pitch and lead as the internal threads but are of obtuse angle so as to be self-locking, for the purpose of holding the bushing rigidly in place. It will be understood that when the bushing is threaded into the aperture 19 until a head 29 on the bushing engages the side of the portion 10 of the arm, the engagement of the head therewith in conjunction with the obtuse angle of the locking threads tightly locks the bushing in place.

It may be mentioned in this connection that the bar 22 initially may be assembled with the portions 10 and 11, that is disposed in the apertures 18 and 19 by angling the bar and inserting one threaded end in one aperture until the other threaded end can be moved past the inner side of the other arm portion and into alignment with the other aperture, and then the bar can be moved reversely to place the threaded portions in approximately proper positions. Then, as indicated previously, the one bushing is inserted.

Now, in order to obtain a proper threaded engagement between the other threaded end, or lower end, as seen in Fig. 1, and the arm portion 11, a tubular tap 31, as shown by Figure 3, is employed. This tap has internal threads 32 properly engageable with the threaded end 25 of the bar 22, and external locking threads 33 adapted to form the threads in the opening 18. The threads 32 and 33 are of the same pitch and lead and the starting points of the two threads are predetermined. Axial flutes 34 are formed in the tap, that is, axially of the threads 33, so that the latter are arranged in circumferentially separated cutting segments.

With the upper bushing 28 in place and the bar freely turnable therein, and the lower threaded end 25 disposed in the aperture 18, the bar 22 and arm portion 11 are held and the tap is threaded onto the threaded end 25 and simultaneously the outer cutting threads form like threads in the aperture. Preferably the wall of the opening 18 will have axial serrations to provide spaces for the cut metal to move into during the thread cutting operation. It will be apparent that after the tap is used, the threads in the aperture and on the threaded end 25 will have the same relation as the threads on the tap. The tap is then removed, and a second bushing, indicated at 35, is threaded into the aperture 18. This bushing has inner and outer threads that have the same relation as the threads on the tap and hence as the threads on the threaded end 25 of the bar and the threads in the aperture 18. Hence, it may be easily started into the aperture and onto the pin and will thread into proper position without requiring the slightest movement of the bar and arm portion 11 relatively along the axis of the bar. Accordingly, the threads at each end of the bar will have a free pivotal engagement with the threads in the bushings, and this is quite important in threaded bearings. It will be readily appreciated that if the starting points, pitch, and lead on the bushing 35 were different from the threads on the end portion 25 of the bar, and in the aperture 18, that some relative axial movement of the bar and arm portion 11 would be necessary and this would place axial pressure on the threads at both points and result in highly detrimental friction in the threads.

The bushing 28 preferably will be disposed in the aperture 19 in the same way, and preferably in advance of insertion of the second bushing. It is to be emphasized however, that the result to be obtained is to have a freely pivotal threaded bearing at each point and to avoid pressing the ends of the arms 10 and 11 apart or together away from their normal positions so as to avoid axial pressure on the threads at both points.

By manufacturing the bushings exactly alike in so far as thread relation is concerned, and using taps manufactured for use in conjunction with these bushings, it is apparent that any bushing can be inserted into any opening where the invention has been employed without causing any binding or undue friction between threads. Replacements, accordingly, are more satisfactory, as a free, threaded, pivotal engagement necessary must be obtained regardless of who puts a replacement bushing into place. Manufacturing operations are better standardized also and in the assembling of automobiles, the danger of having unmatched threads or undesirable friction in threads of pivotal bearings is practically eliminated.

Although only one form of the invention has been illustrated and discussed in detail, it will be apparent to those skilled in the art that various modifications may be made without departing from the scope of the appended claims.

What is claimed is:

1. The method of manufacturing and pivotally assembling two parts of a structure wherein one part includes two like threaded pin portions substantially fixed relatively and the other part includes two openings substantially fixed relatively and into which the pin portions are adapted to project and at least one of which openings is larger than the pin portion therefor, which comprises establishing a threaded, pivotal bearing between said one pin portion and said one opening, threading a tubular tap having internal threads and external cutting threads wherein such threads have the same pitch and lead as the threads on the other pin portion onto such other pin portion and simultaneously causing the external threads on the member to cut threads in said other opening, removing the tap, and then threading an internally and externally threaded bushing into the opening wherein the internal and external threads on the bushing have the same relation as the internal and external threads on the tap.

2. The method of manufacturing and assembling a pivot rod and yoke so as to provide a threaded bearing for the yoke, which comprises forming threads on aligned opposite ends of the rod, forming aligned apertures in the yoke arms for receiving the ends of the rod and wherein at least one of the apertures in one arm is larger than the threaded end of the rod therefor, establishing a threaded pivotal bearing between the aperture in the other arm and the other threaded end of the rod, utilizing a tubular tap having internal threads adapted to engage the threads on the first mentioned threaded end of the rod and having external axially fluted cutting threads of the same pitch and lead as the internal threads and which are adapted to cut threads in the larger aperture for such threaded end, threading said tap onto said first mentioned end of the rod and simultaneously causing the external cutting threads to cut like threads in the aperture, removing the tap, and then threading a tubular bushing into the end of the rod and into the aperture wherein the internal and external threads on the tap are of the same pitch and lead as the threads on the tap and wherein they have the same circumferentially relative starting points as the threads on the tap.

JOHN W. LEIGHTON.